US008072746B2

(12) United States Patent
Hung et al.

(10) Patent No.: US 8,072,746 B2
(45) Date of Patent: Dec. 6, 2011

(54) ELECTRONIC DEVICE WITH A CASING WITH A CONTAINING SPACE FOR STORING AN ADAPTING ELEMENT WHEN NOT IN USE

(75) Inventors: Shih-Wei Hung, Taipei (TW); Xiao Ye, Shanghai (CN); Sheng-Yuan Hsiao, Taipei (TW)

(73) Assignee: Pegatron Corporation, Taipei (TW)

( * ) Notice: Subject to any disclaimer, the term of this patent is extended or adjusted under 35 U.S.C. 154(b) by 158 days.

(21) Appl. No.: 12/719,061

(22) Filed: Mar. 8, 2010

(65) Prior Publication Data

US 2010/0240235 A1 Sep. 23, 2010

(30) Foreign Application Priority Data

Mar. 20, 2009 (TW) ............................... 98204484 U

(51) Int. Cl.
*G06F 1/16* (2006.01)

(52) U.S. Cl. .................................................. 361/679.41

(58) Field of Classification Search ............... 361/679.2, 361/679.32, 679.41, 679.42, 683, 687; 439/367, 439/638; 700/1, 303
See application file for complete search history.

(56) References Cited

U.S. PATENT DOCUMENTS

| | | | | |
|---|---|---|---|---|
| 6,525,932 | B1 * | 2/2003 | Ohnishi et al. | 361/679.41 |
| 6,887,005 | B2 * | 5/2005 | Kim | 400/715 |
| 7,611,371 | B2 * | 11/2009 | Guo | 439/367 |
| 7,744,423 | B2 * | 6/2010 | Funahashi | 439/638 |
| 7,857,653 | B2 * | 12/2010 | Fujita et al. | 439/367 |
| 2004/0264126 | A1 * | 12/2004 | Wells | 361/687 |
| 2006/0061964 | A1 * | 3/2006 | Cheng | 361/687 |
| 2006/0104017 | A1 * | 5/2006 | Chang et al. | 361/683 |
| 2007/0206347 | A1 * | 9/2007 | Kuo | 361/683 |
| 2010/0169531 | A1 * | 7/2010 | Bae | 710/303 |
| 2010/0235560 | A1 * | 9/2010 | Oh et al. | 710/301 |
| 2011/0157804 | A1 * | 6/2011 | Chen et al. | 361/679.14 |

FOREIGN PATENT DOCUMENTS

| | | |
|---|---|---|
| CN | 2483751 | 3/2007 |
| CN | 1971477 | 5/2007 |
| CN | 200990031 | 12/2007 |

OTHER PUBLICATIONS

English abstract of CN200990031, pub. Dec. 12, 2007.
English abstract of CN2483751, pub. Mar. 27, 2007.
English abstract of CN1971477, pub. May 30, 2007.

* cited by examiner

*Primary Examiner* — Chandrika Prasad
(74) *Attorney, Agent, or Firm* — Thomas, Kayden, Horstemeyer & Risley, LLP

(57) ABSTRACT

This invention provides an electronic device capable of being connected with an external device. The electronic device includes a first connecting port, an adapting element, and a casing. The first connecting port is disposed at the casing. The adapting element has a second connecting port and a connector. The size of the second connecting port is greater than that of the first connecting port. The casing has a containing space for containing the adapting element. When the electronic device is connected with the external device, the adapting element is separated from the containing space, the connector is connected with the first connecting port, and the second connecting port is connected with the external device.

9 Claims, 8 Drawing Sheets

ELECTRONIC DEVICE WITH A CASING WITH A CONTAINING SPACE FOR STORING AN ADAPTING ELEMENT WHEN NOT IN USE

CROSS-REFERENCE TO RELATED APPLICATIONS

This Non-provisional application claims priority under 35 U.S.C. §119(a) on Patent Application No(s). 098204484 filed in Taiwan, Republic of China on Mar. 20, 2009, the entire contents of which are hereby incorporated by reference.

BACKGROUND OF THE INVENTION

1. Field of the Invention

This invention relates to an electronic device and, more particularly, to an electronic device having a containing function.

2. Description of the Related Art

With development of electronic technology, electronic devices with small volume and powerful functions attract more and more users. Usually the electronic devices need various kinds of input/output (I/O) connecting ports for connecting other external devices. A notebook computer is taken for example. A plurality of I/O connecting ports, such as a video graphics array (VGA) port and a digital visual interface (DVI) port, are usually disposed at one side of a casing of the notebook computer. According to standard definitions of different connectors, the I/O connecting ports usually have a certain size, respectively.

FIG. 1 is a schematic diagram showing a conventional notebook computer having a VGA port. In FIG. 1, a first thickness h1 of a VGA port 10 of a notebook computer 1 in a vertical direction is greater than a second thickness h2 of a lower casing 11 of the notebook computer 1 in the same direction. Therefore, as shown in FIG. 1, when the VGA port 10 is disposed at one side of the lower casing 11 of the notebook computer 1, the bottom of the VGA port 10 is protrudent from the notebook computer 1. Thus, the aesthetics of the notebook computer is deteriorated.

BRIEF SUMMARY OF THE INVENTION

This invention provides an electronic device to improve the prior art.

The invention provides an electronic device capable of being connected with an external device. The electronic device includes a first connecting port, an adapting element, and a casing. The first connecting port is disposed at the casing. The adapting element has a second connecting port and a connector. The size of the second connecting port is greater than that of the first connecting port. The casing has a containing space for containing the adapting element. When the electronic device is connected with the external device, the adapting element is separated from the containing space, the connector is connected with the first connecting port, and the second connecting port is connected with the external device.

According to the electronic device in the invention, the external device can be connected with the electronic device by the adapting element. The size of the first connecting port disposed at the casing of the electronic device is smaller than that of the second connecting port directly connected with the external device. Therefore, compared with the prior art, the appearance of the electronic device in the invention has a streamlined effect which can meet users' needs for the appearance of the electronic device. In addition, the casing of the electronic device further has a containing space for containing the adapting element. Thus, components at the outside of the casing of the electronic device can be reduced to facilitate taking the electronic device by the users, and the adapting element is not easy to lose.

These and other features, aspects, and advantages of the present invention will become better understood with regard to the following description, appended claims, and accompanying drawings.

DETAILED DESCRIPTION OF THE INVENTION

Figure 1:
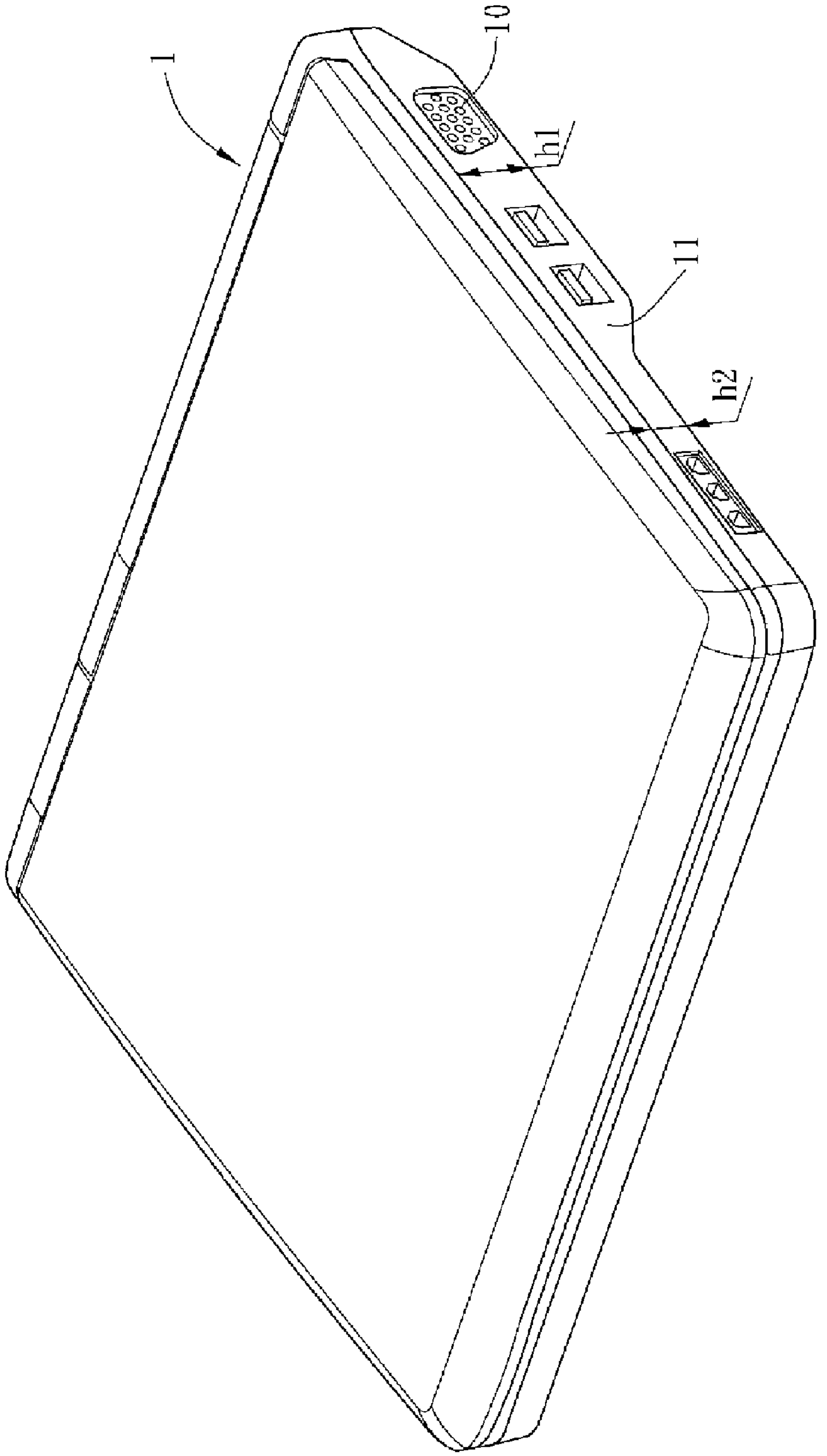
FIG. 1 (Prior Art)
FIG. 1 is a schematic diagram showing a conventional notebook computer having a video graphics array (VGA) port.
Figure 2A:
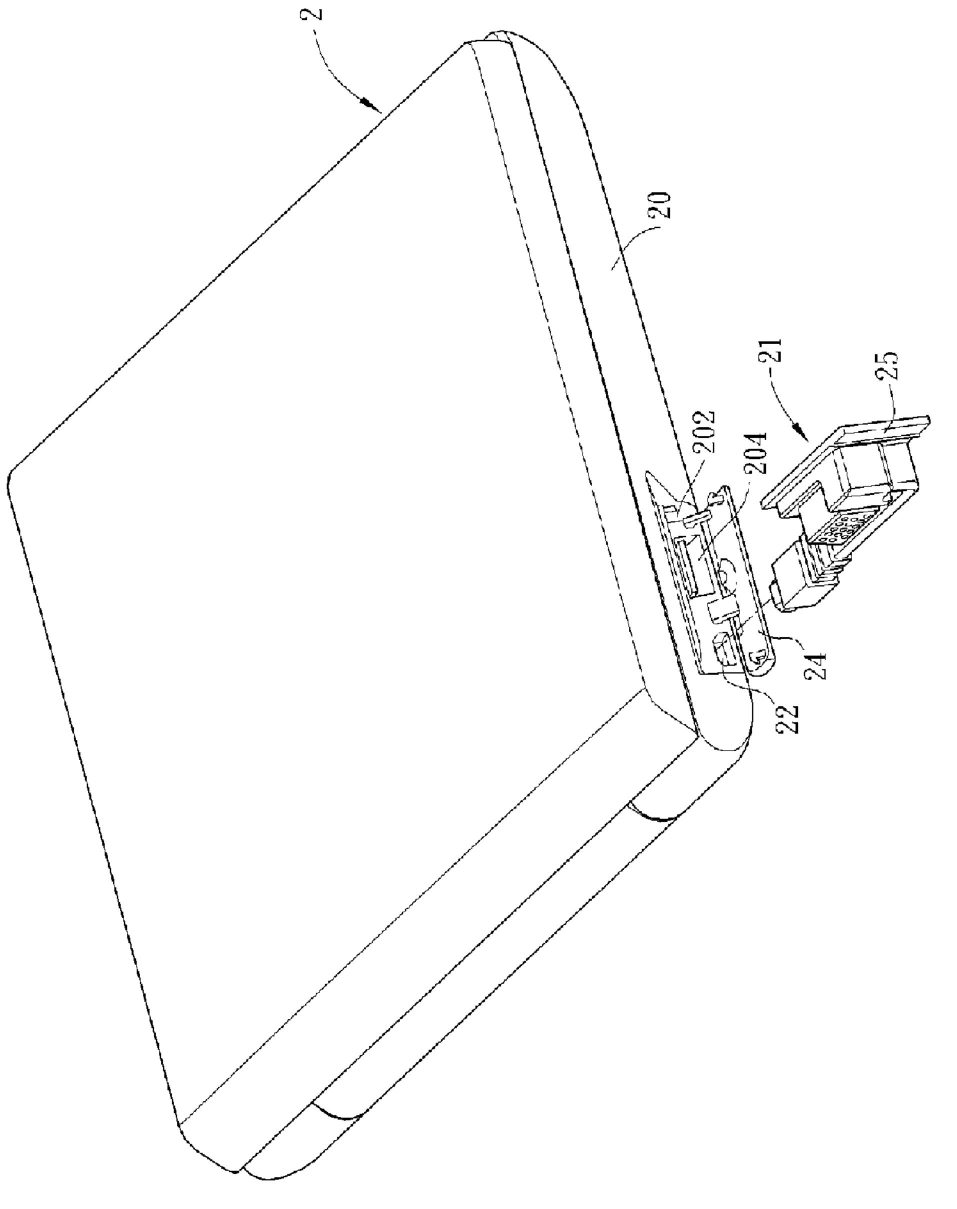
FIG. 2A is a three-dimensional schematic diagram showing an electronic device according to one preferred embodiment of the invention.
Figure 2B:
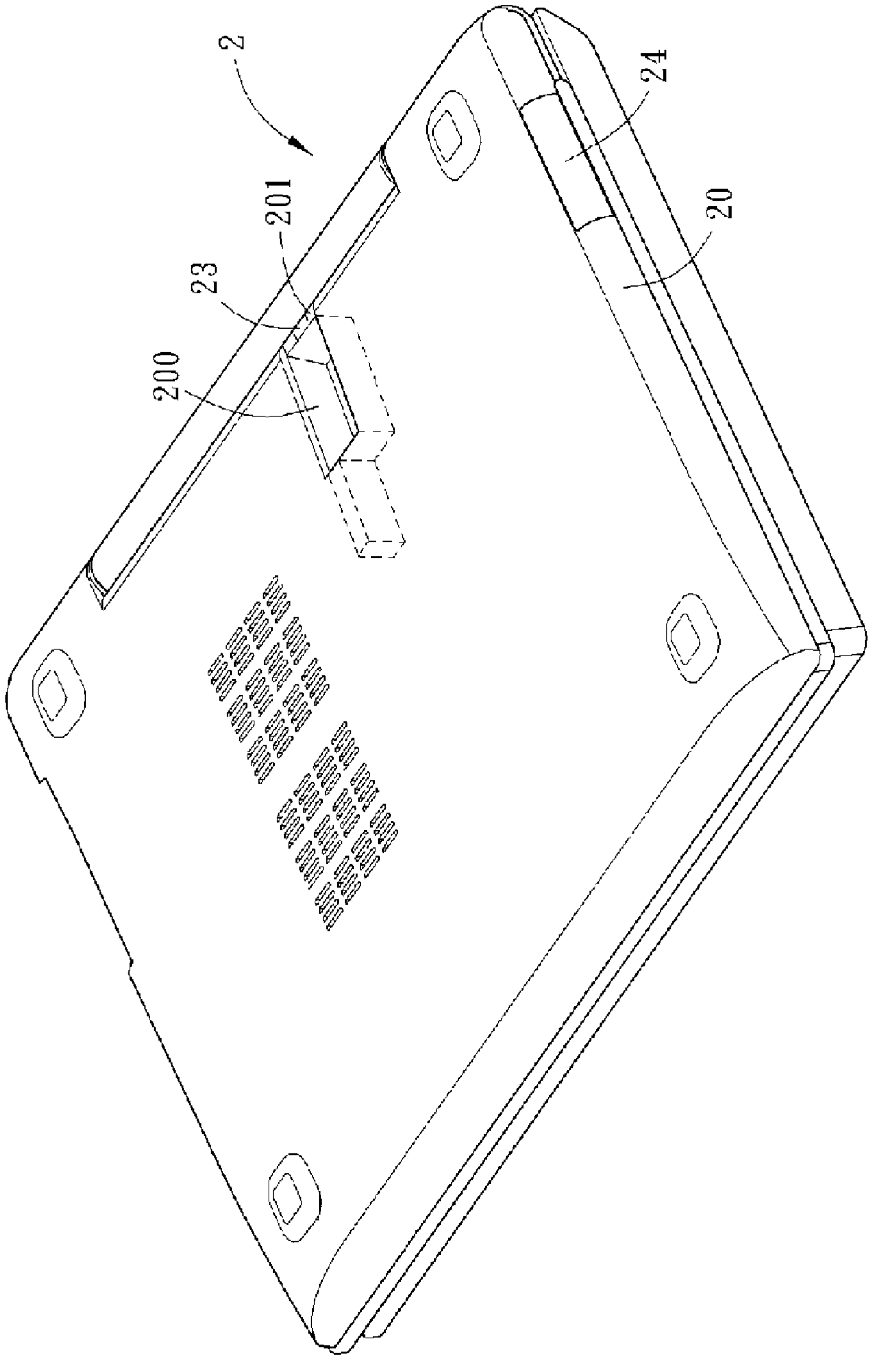
FIG. 2B is a schematic diagram showing a back side of an electronic device according to one preferred embodiment of the invention.

FIG. 2A is a three-dimensional schematic diagram showing an electronic device according to one preferred embodiment of the invention. FIG. 2B is a schematic diagram showing a back side of the electronic device according to one preferred embodiment of the invention. Please refer to FIG. 2A and FIG. 2B together. In the embodiment, a notebook computer as an electronic device 2 is taken for example. However, the invention is not limited thereto. In other embodiments, the electronic device 2 may be in any other form such as a cell phone or a personal digital assistant (PDA).

The electronic device 2 in the embodiment includes a casing 20, an adapting element 21, a first connecting port 22, a first fixing element 23, a first protective cover 24, and a second fixing element 25.

In the embodiment, the casing 20 may be a casing of a main body of the notebook computer, i.e. a lower casing. The casing 20 has an opening 202 at one side for exposing input/output (I/O) ports. In FIG. 2A, the I/O ports may include the first connecting port 22 and a universal serial bus (USB) port 204. However, the invention is not limited thereto.

The first connecting port 22 can be used for connecting the adapting element 21. The detailed structure of the adapting element 21 is described hereinbelow. In the embodiment, the first connecting port 22 can be a customized small port such as a customized 12-pin port. However, the invention is not limited thereto.

In the embodiment, the first protective cover 24 can be pivotally connected with the casing 20 at one side such as the lower side of the opening 202. When the I/O ports are not used, the first protective cover 24 can be rotated upwards for covering the opening 202 to maintain integrity of the appearance of the electronic device 2 and to achieve a dustproof function. However, the invention is not limited thereto. In other embodiments, the first protective cover 24 may further be pivotally connected with the casing 20 at other portions or may be a component independent of the casing 20. In addition, the first protective cover 24 may not be needed.

In the embodiment, the casing 20 of the electronic device 2 has a containing space 200. When the adapting element 21 is not used, the adapting element 21 can be contained in the containing space 200. In the embodiment, to maintain aesthetics of the electronic device 2, the containing space 200 can be disposed at the bottom of the casing 20. In addition, the shape and volume of the containing space 200 can correspond to that of the adapting element 21. For example, in FIG. 2B, to correspond to the L-shaped adapting element 21, the containing space 200 is also designed to be L-shaped, and the volume of the containing space 200 is equal to that of the adapting element 21. In other embodiments, the volume of the containing space 200 may also be designed to be greater than that of the adapting element 21. The location, shape, and volume of the containing space 200 are not limited in the invention.

In the embodiment, the first fixing element 23 is disposed in the containing space 200 of the casing 20. In detail, a step 201 is disposed in the containing space 200, and the first fixing element 23 can be disposed at the top surface of the step 201. However, the invention is not limited thereto.

In the embodiment, the second fixing element 25 is disposed at the adapting element 21. Further, when the adapting element 21 is contained in the containing space 200, the first fixing element 23 can be correspondingly combined with the second fixing element 25. Via force between the first fixing element 23 and the second fixing element 25, the adapting element 21 can be fixed in the containing space 200. Thus, the adapting element 21 can be prevented from moving in the containing space 200 at random to damage or scrape side walls of the containing space 200.

In the embodiment, the first fixing element 23 can be a magnet, and the second fixing element 25 can be a metal element such as an iron sheet. Otherwise, the first fixing element 23 can be a metal element, and the second fixing element 25 can be a magnet. In addition, both the first fixing element 23 and the second fixing element 25 can be magnets. At that moment, when the adapting element 21 is contained in the containing space 200, two opposite poles of the first fixing element 23 and the second fixing element 25 can face to each other.

In the embodiment, via magnetic attraction between the first fixing element 23 and the second fixing element 25, the adapting element 21 can be fixed in the containing space 200. In other embodiments, the adapting element 21 may be fixed in the containing space 200 in a mechanical fixing mode. For example, the first fixing element 23 may be a groove, and the second fixing element 25 may be a fastening hook. Thus, via the fastening force between the first fixing element 23 and the second fixing element 25, the adapting element 21 can be fixed in the containing space 200. However, the invention is not limited thereto.

Figure 3A:
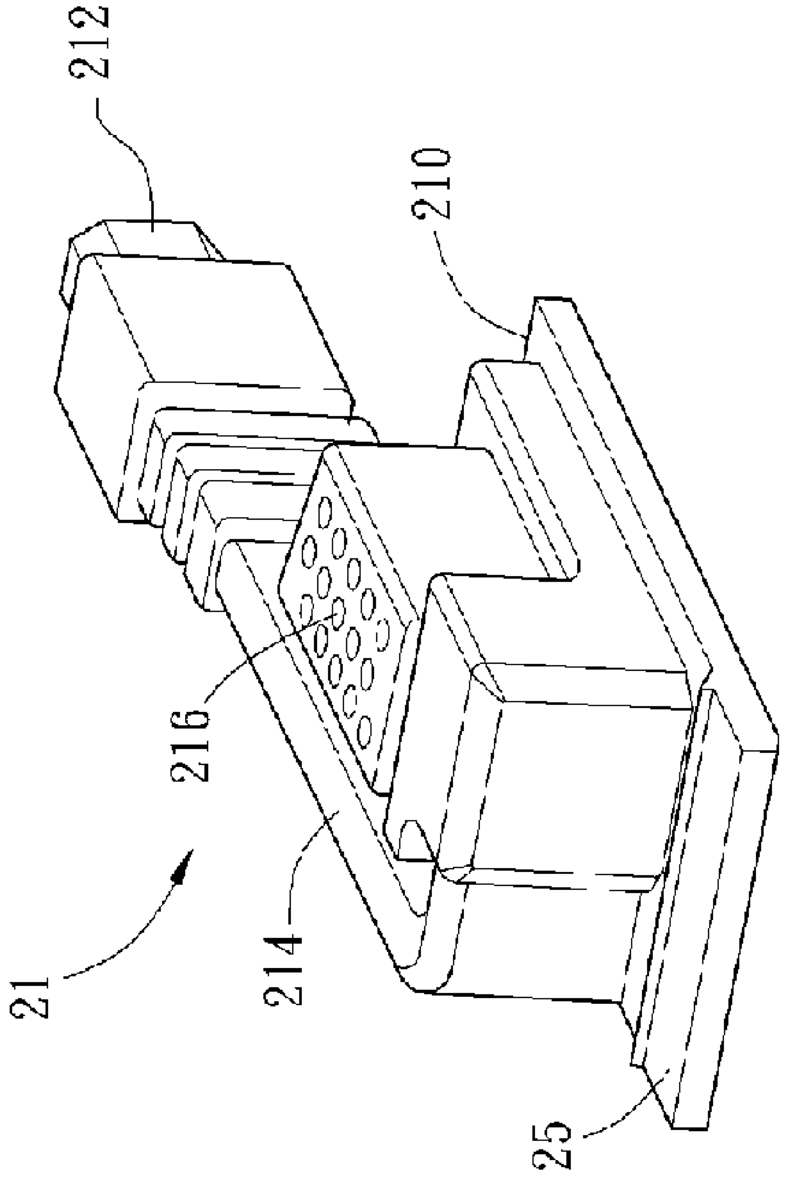
FIG. 3A is a schematic diagram showing an adapting element in FIG. 2A.
Figure 3B:
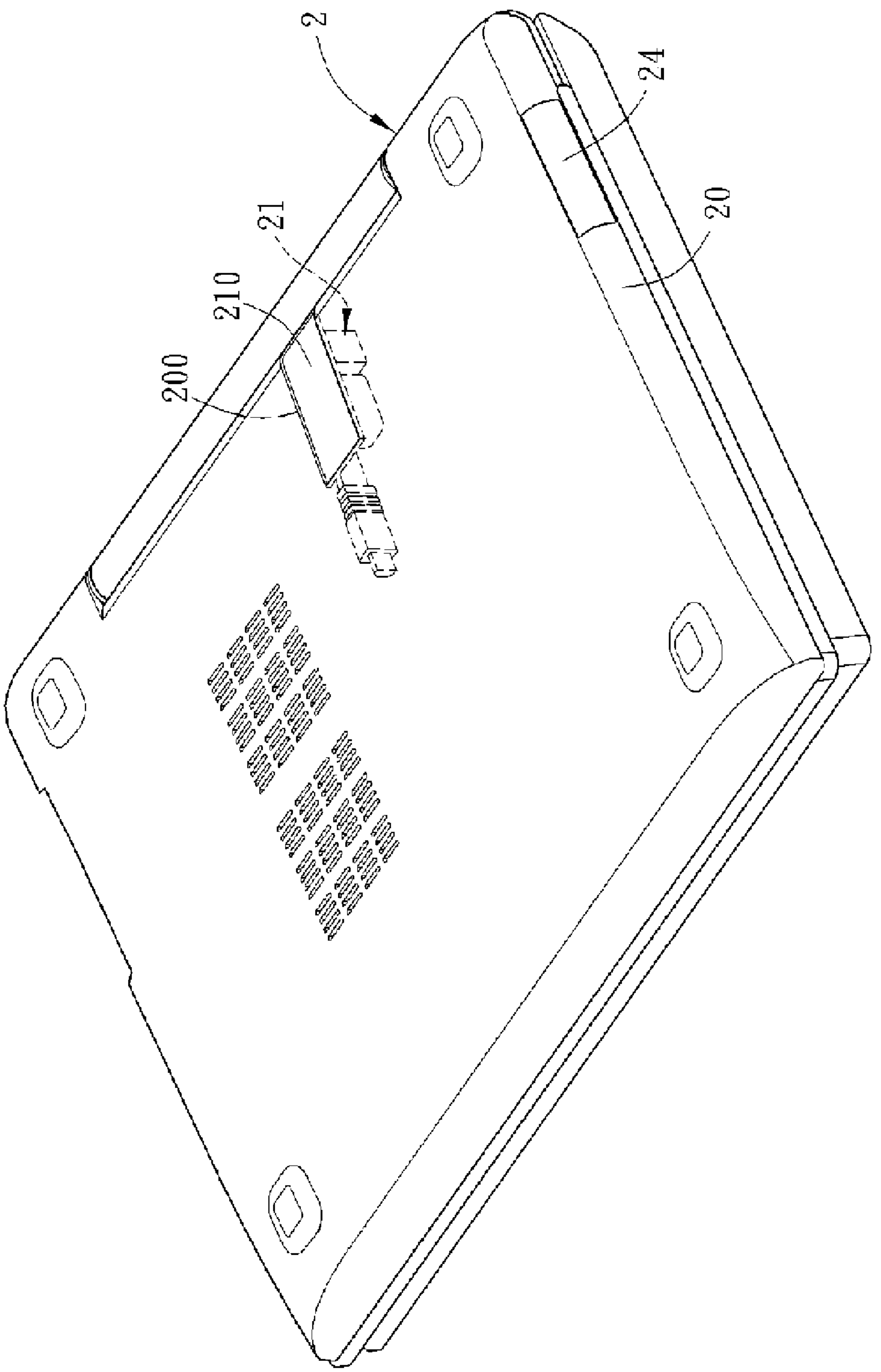
FIG. 3B is a schematic diagram showing an adapting element contained in a containing space according to one preferred embodiment of the invention.

FIG. 3A is a schematic diagram showing the adapting element 21 in FIG. 2A. FIG. 3B is a schematic diagram showing the adapting element 21 contained in the containing space 200 according to one preferred embodiment of the invention. Please refer to FIG. 2A, FIG. 3A, and FIG. 3B together.

In FIG. 3A, the adapting element 21 in this embodiment includes a connector 212, a connecting element 214, a second connecting port 216, and a second protective cover 210.

In the embodiment, the second connecting port 216 and a portion of the connecting element 214 are disposed at the second protective cover 210. However, the invention is not limited thereto. In other embodiments, both the second connecting port 216 and the connecting element 214 may be disposed at the second protective cover 210.

The second connecting port 216 is used for connecting an external device (not shown). In the embodiment, the second connecting port 216 can be a standard video graphics array (VGA) port. However, the invention is not limited thereto. In other embodiments, the second connecting port 216 may be a digital visual interface (DVI) port, a serial port, a parallel port, or other I/O ports.

In the embodiment, the connector 212 can correspondingly transmit a signal from the first connecting port 22 to the second connecting port 216. That is, signals transmitted by the first connecting port 22, the connector 212, and the second connecting port 216 can be in the same standard. For example, when the second connecting port 216 is a standard VGA port, the connector 212 and the first connecting port 22 can be correspondingly customized to be interfaces for transmitting analog signals. Thus, the connector 212 can transmit the analog signal received from the first connecting port 22 to the second connecting port 216. However, the invention is not limited thereto.

In the embodiment, the connector 212 can be a customized small connector for correspondingly connecting the first connecting port 22 of the electronic device 2. The connector 212 may be correspondingly customized to be a 12-pin connector. However, the invention is not limited thereto. The connector 212 may be other correspondingly customized small connecting ports, as long as the designs of the first connecting port 22 and the connector 212 can meet users' needs and corresponding signal transmission requirements of the second connecting port 216.

In the embodiment, the size of the connector 212 is about equal to that of the first connecting port 22, while the size of the second connecting port 216 is greater than that of the first connecting port 22. Since the second connecting port 216 is used for connecting the external device, the size thereof usually needs to meet a specific specification which cannot be changed at random. Therefore, in the embodiment, the second connecting port 216 in the greater size is independent of the electronic device 2, and only the first connecting port 22 in the smaller size is disposed at the casing 20 of the electronic device 2. Finally, the first connecting port 22 can be connected with the second connecting port 216 via the connector 212. Thus, the signals can be normally transmitted, and the aesthetics of the electronic device 2 can also be considered.

In the embodiment, the connecting element 214 is electrically connected with the connector 212 and the second connecting port 216. The connecting element 214 can be made of a soft material. However, the invention is not limited thereto.

In the embodiment, the second protective cove 210 can be used for covering the containing space 200 of the casing 20. In FIG. 3B, when the adapting element 21 is contained in the containing space 200, the second protective cover 210 covers the containing space 200 of the casing 20. Thus, the integrity of the electronic device 2 can be maintained, and the dust-proof function can be achieved. The size of the second protective cover 210 can allow the second protective cover 210 to just cover the containing space 200. Further, the color and material thereof can be the same with that of the casing 20 around the containing space 200, thus to ensure the smoothness and uniformity of the bottom of the casing 20. However, the invention is not limited thereto.

In the embodiment, a portion of the adapting element 21 as the second protective cover 210 is taken for example. However, in other embodiments, the second protective cover 210 may also be independent of the adapting element 21. For example, the second protective cover 210 may be pivotally connected with the casing 20 and may be disposed at one side of the containing space 200. Thus, the containing space 200 can be correspondingly covered or exposed by rotating the second protective cover 210. However, the invention is not limited thereto. The second protective cover 210 may further be a component independent of the adapting element 21 and the casing 20.

In the embodiment, the second fixing element 25 can be disposed at the second protective cover 210 of the adapting element 21. How the second fixing element 25 is used to fix the adapting element 21 in the containing space 200 is described in detail in the above embodiment. Therefore, it is not described hereinbelow for a concise purpose.

Figure 4A:
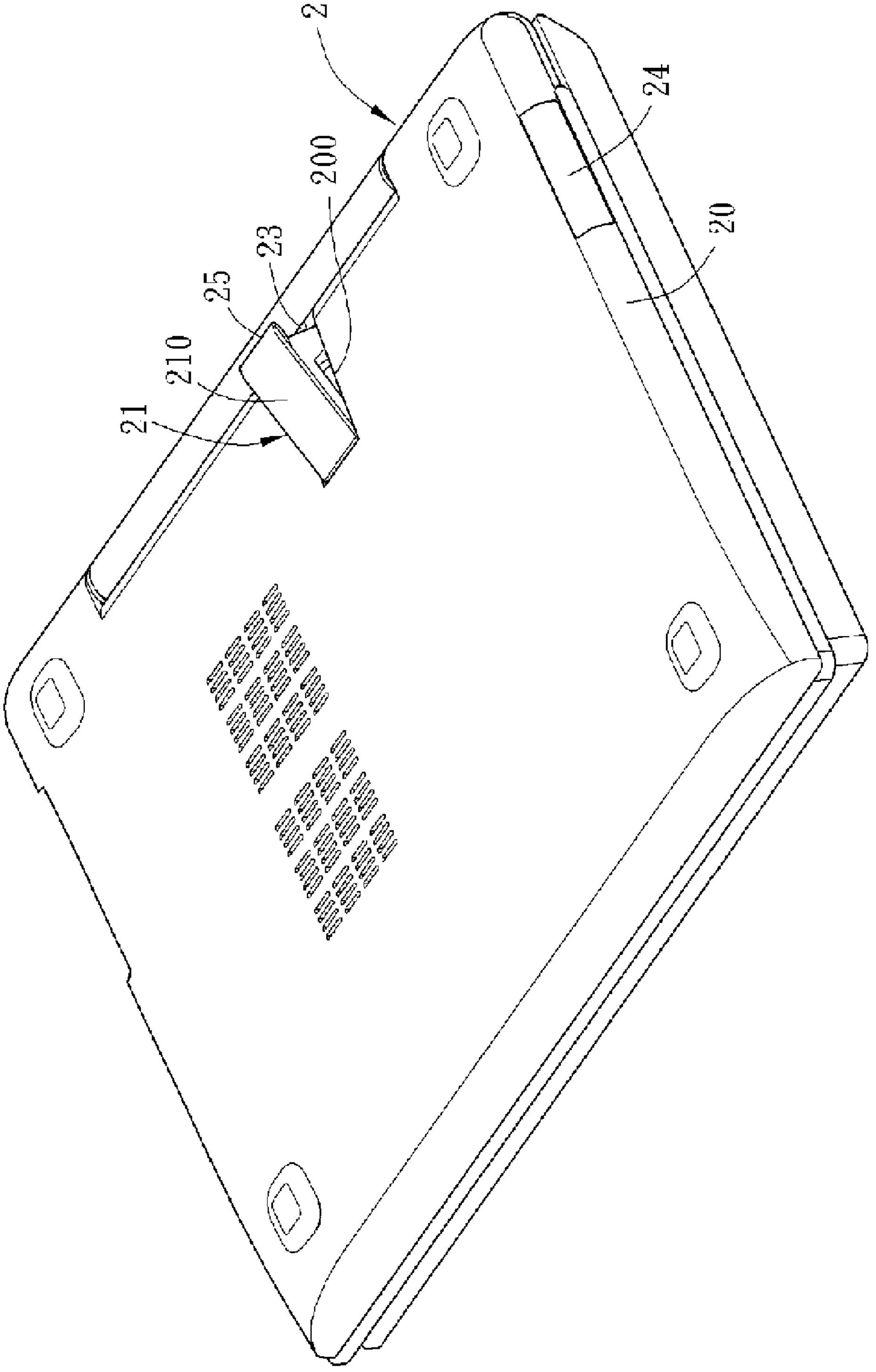
FIGS. 4A to 4C are schematic diagrams showing an adapting element of an electronic device in use according to one preferred embodiment of the invention.
Figure 4B:
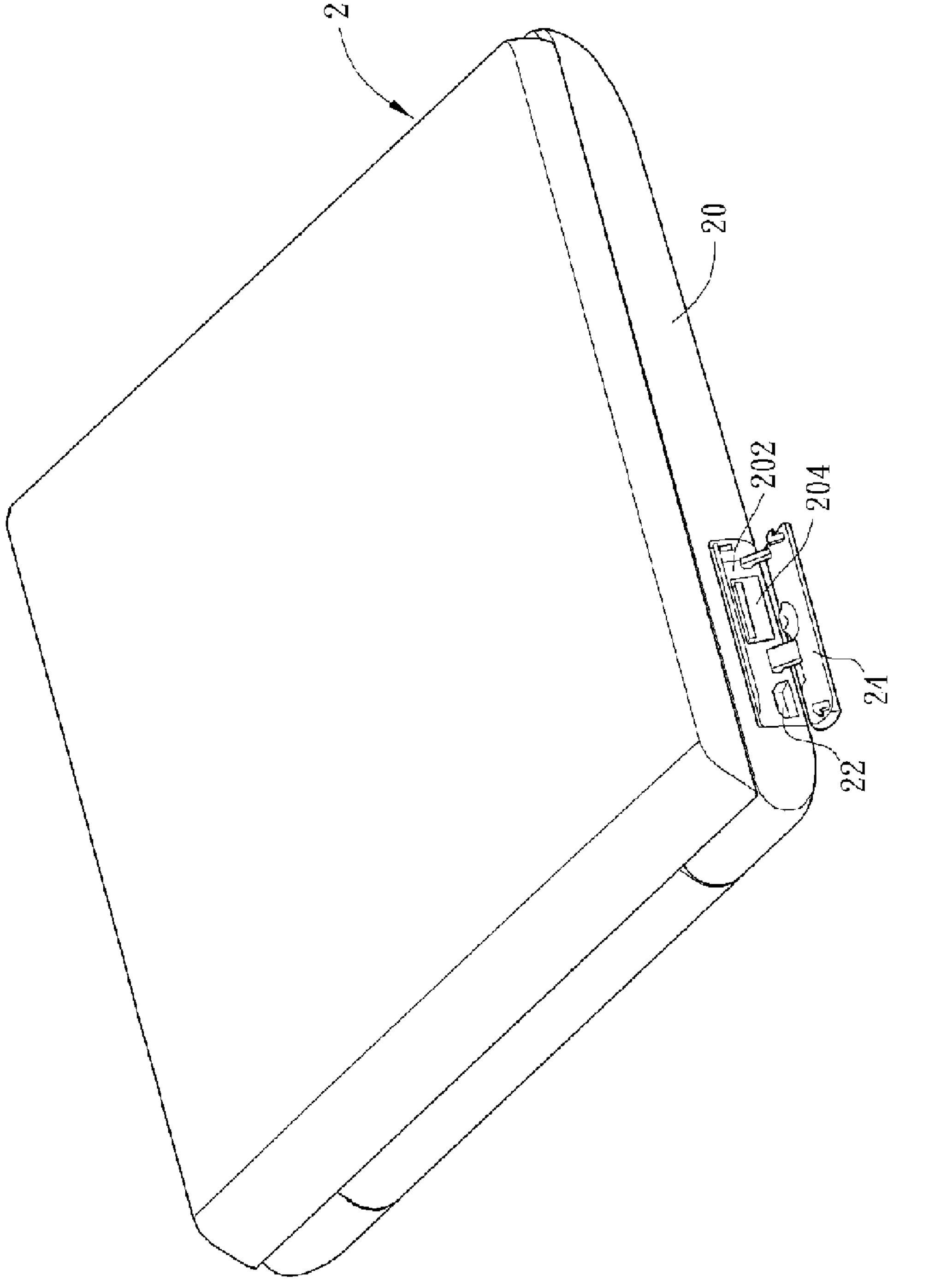
Figure 4C:
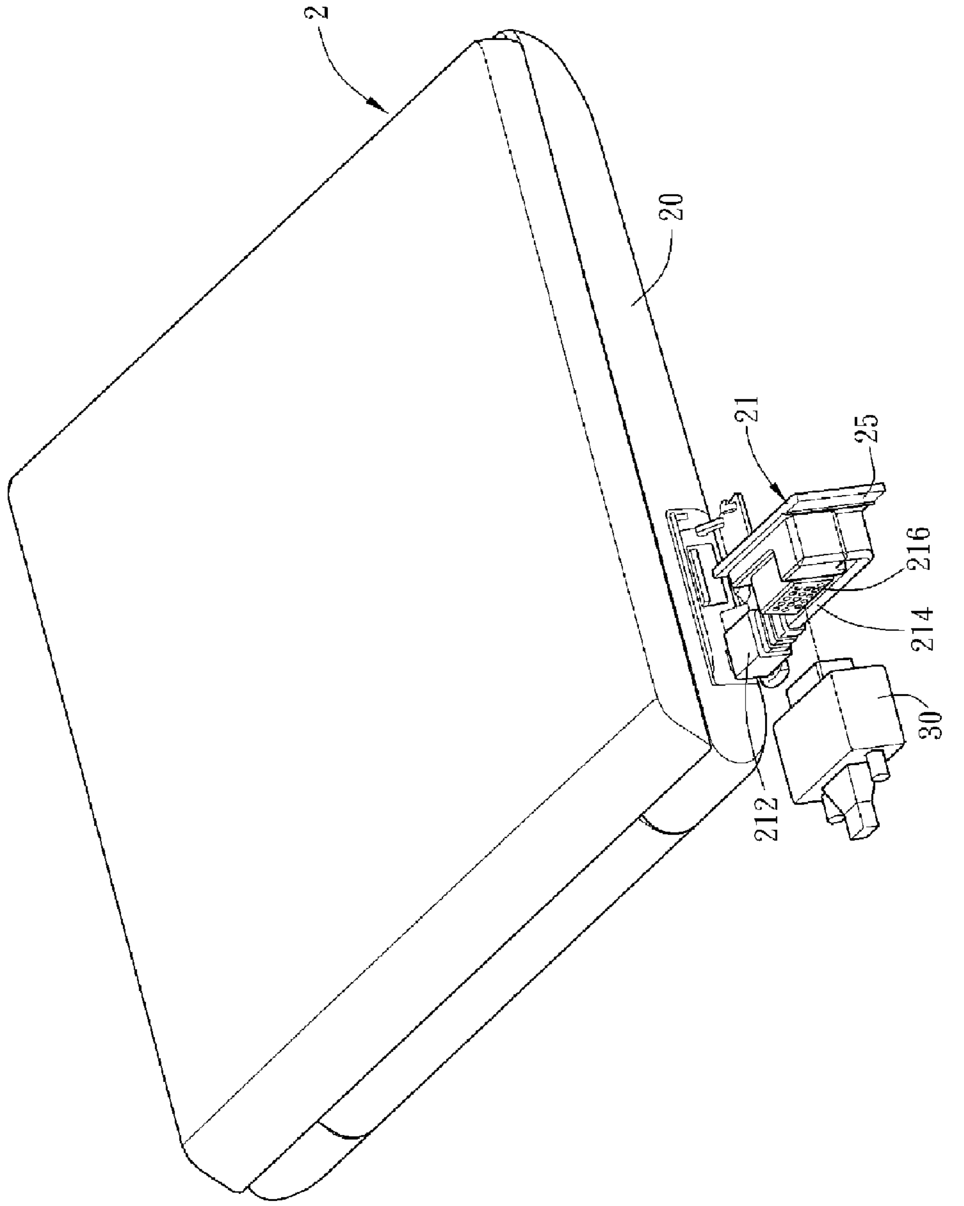

FIGS. 4A to 4C are schematic diagrams showing the adapting element 21 of the electronic device 2 in use according to one preferred embodiment of the invention. Please refer to FIGS. 4A to 4C.

In the embodiment, when the electronic device 2 needs to be connected with an external device (such as a cathode ray tube display), the user can take the adapting element 21 out of the containing space 200 at the bottom of the casing 20. That is, the adapting element 21 is separated from the containing space 200. In detail, as shown in FIG. 4A, the user can exert upward force on the second protective cover 210 of the adapting element 21. The upward force needs to be greater than the force between the first fixing element 23 and the second fixing element 25. Thus, the adapting element 21 can be separated from the containing space 200.

In the embodiment, as shown in FIG. 4B, after the adapting element 21 is separated from the containing space 200, the user can open the first protective cover 24 to expose the first connecting port 22.

At that moment, as shown in FIG. 4C, the connector 212 of the adapting element 21 can be correspondingly inserted into the first connecting port 22. The second connecting port 216 of the adapting element 21 can be correspondingly connected with an external connector 30 of the external device.

In the embodiment, the connecting element 214 not only ensures the electrical connection between the second connecting port 216 of the adapting element 21 and the connector 212, but also remains an enough connecting space for the second connecting port 216 and the connector 212. Thus, the signal from the first connecting port 22 can be successfully transmitted to the corresponding external connector 30 via the connector 212, the connecting element 214, and the second connecting port 216.

Finally, after use of the adapting element 21 is finished, the adapting element 21 can be correspondingly contained in the containing space 200 of the casing 20 and can be fixed by the force between the first fixing element 23 and the second fixing element 25.

To sum up, the electronic device in the embodiment of the invention is connected with the external device via the adapting element. The size of the first connecting port disposed at the casing of the electronic device is smaller than that of the second connecting port directly connected with the external device. Therefore, the appearance of the electronic device in the embodiment of the invention has a streamlined effect, which can meet the users' needs for the appearance of the electronic device. In addition, the casing of the electronic device further has a containing space for containing the adapting element. Thus, components at the outside of the casing of the electronic device can be reduced thus to facilitate taking the electronic device by the users, and the adapting element is not easy to lose. When the adapting element is contained in the containing space, because of the second protective cover, the casing of the electronic device can also be ensured to have smooth and uniform appearance.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An electronic device capable of being connected with an external device, the electronic device comprising:

a first connecting port;

an adapting element having a second connecting port and a connector, the size of the second connecting port greater than that of the first connecting port; and a casing having a containing space for containing the adapting element, the first connecting port disposed at the casing, wherein when the electronic device is connected with the external device, the adapting element is separated from the containing space, the connector is connected with the first connecting port, and the second connecting port is connected with the external device.

2. The electronic device according to claim 1, wherein the second connecting port of the adapting element is a standard video graphics array (VGA) port.

3. The electronic device according to claim 2, wherein the first connecting port is a 12-pin port, and the connector of the adapting element is a 12-pin connector.

4. The electronic device according to claim 1, wherein the adapting element further comprises a connecting element electrically connected with the second connecting port and the connector.

5. The electronic device according to claim 4, wherein the connecting element is made of a soft material.

6. The electronic device according to claim 1, further comprising a first protective cover for covering the first connecting port.

7. The electronic device according to claim 1, wherein the adapting element further comprises a second protective cover for covering the containing space of the casing, and the second connecting port is disposed at the second protective cover.

8. The electronic device according to claim 1, further comprising:

a first fixing element disposed in the containing space; and a second fixing element disposed at the adapting element, when the adapting element is contained in the containing space, force between the first fixing element and the second element allowing the adapting element to be fixed in the containing space.

9. The electronic device according to claim 8, wherein the first fixing element is a magnet, and the second fixing element is a metal element.

* * * * *